E. DOUDEN.
BREAKER ROLLER.

No 100,273. Patented Mar. 1, 1870.

Witnesses:
A. W. Almquist
Jno. F. Brooks

Inventor:
E. Douden
per Munn & Co.
Attorneys.

United States Patent Office.

EDWIN DOUDEN, OF LYKENS, PENNSYLVANIA, ASSIGNOR TO HIMSELF AND CHARLES BROOME, OF SAME PLACE.

*Letters Patent No* 100,273, *dated March* 1, 1870.

IMPROVEMENT IN BREAKER-ROLLERS.

The Schedule referred to in these Letters Patent and making part of the same.

*To all whom it may concern:*

Be it known that I, EDWIN DOUDEN, of Lykens, in the county of Dauphin, and State of Pennsylvania, have invented a new and useful Improvement in Breaker-Rollers; and I do hereby declare that the following is a full, clear, and exact description thereof, which will enable others skilled in the art to make and use the same, reference being had to the accompanying drawings forming part of this specification, in which—

Similar letters of reference indicate corresponding parts.

My invention has for its object to furnish an improvement in the construction of breaker-rollers, by means of which the teeth may be detached and sharpened when required, and which will enable the breaker to split the coal, instead of crushing it, as is the case with breakers constructed in the ordinary manner; and It consists in the construction of the roller and of the detachable teeth, as hereinafter more fully described.

A represents the roller, which is cast with a smooth surface or face, instead of being made with teeth cast solid upon it, in the ordinary manner.

In the shell of the roller A is cast or otherwise formed a sufficient number of holes, $a'$, all of the same size, which holes are designed to receive the teeth.

Figure 2:
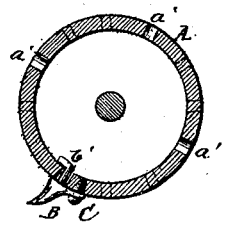
Figure 2 is a cross-section of the same.
Figure 3:
Figure 3 is a detail under-side view of one of the detachable teeth.

B are the teeth, the bases of which are so formed as to fit upon the surface of the roller A, and which have hooks, $b'$, formed upon the forward parts of their bases, which pass through the holes $a'$ in the roller A, and hook upon the inner surface of the shell of the said roller, as shown in fig. 2.

Figure 1:
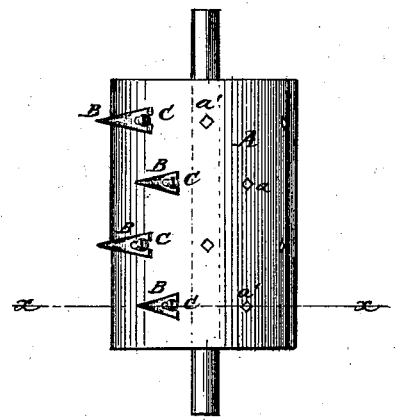
Figure 1 is a side view of my improved breaker-roller.

The rear part of the base of the teeth B is slotted, to receive a set-screw, C, screwed into the shell of the roller in the rear of the said teeth, as shown in figs. 1 and 2.

The teeth B are made of steel or iron, so that they may be removed and sharpened when they may have become dulled with use, and, being made of steel, they will wear longer without becoming dull, and will last longer than the teeth cast solid upon the roller, in the ordinary manner.

The form and construction of the teeth B also cause them to split the coal, instead of crushing it, in the manner of the ordinary breaker.

Having thus described my invention,

I claim as new, and desire to secure by Letters Patent—

A smooth-faced roller, A, having holes $a'$ of uniform size, combined with detachable slotted teeth B fitting therein, and having hooks $b'$ formed upon the forward parts of their bases to fasten inside of the said holes, all as shown and described, and for the purpose specified.

EDWIN DOUDEN.

Witnesses:
FRED. J. DOUDEN,
SCOTT BROOME.